United States Patent [19]
Reynolds et al.

[11] Patent Number: 4,731,609
[45] Date of Patent: Mar. 15, 1988

[54] FAST CORRELATION OF MARKERS WITH GRAPHIC ENTITIES

[75] Inventors: David C. Reynolds, Boulder; Michael Wong, Longmont, both of Colo.

[73] Assignee: International Business Machines Corporation, Armonk, N.Y.

[21] Appl. No.: 926,928

[22] Filed: Nov. 3, 1986

[51] Int. Cl.⁴ .................... G06F 15/60; G09G 1/16
[52] U.S. Cl. .................... 340/747; 340/709; 364/521
[58] Field of Search .................... 340/747, 709, 710; 364/521

[56] References Cited

U.S. PATENT DOCUMENTS

| 3,997,891 | 12/1976 | Iwamura et al. | 340/324 AD |
| 4,555,775 | 11/1985 | Pike | 340/747 |
| 4,559,533 | 12/1985 | Bass et al. | 340/747 |
| 4,593,372 | 6/1986 | Bondai et al. | 364/521 |
| 4,609,917 | 9/1986 | Shen | 340/747 |
| 4,665,555 | 5/1987 | Alker | 340/747 |
| 4,683,468 | 7/1987 | Himelstein | 340/710 |
| 4,686,522 | 8/1987 | Hernandez et al. | 340/747 |
| 4,688,181 | 8/1987 | Cottrell et al. | 340/747 |

Primary Examiner—Howard A. Birmiel
Attorney, Agent, or Firm—Carl M. Wright

[57] ABSTRACT

Graphics display system having a moving cursor, such as a cursor, for selecting a displayed entity. The correlation of a cursor with an entity intended to be selected is performed by storing a unique tag assigned to each entity in a cell in a correlation array related to a pel or group of pels corresponding to locations in a bit map of the pels comprising the entity. The x,y coordinates of the cursor are converted into a cell number corresponding to the bit map locations matching such x,y coordinates. The entity tag is then retrieved from the addressed cell.

3 Claims, 4 Drawing Figures

FAST CORRELATION OF MARKERS WITH GRAPHIC ENTITIES

DOCUMENTS INCORPORATED BY REFERENCE

The applicable parts of "Algorithms for Graphics and Image Processing," Theo Pavlidis (Computer Science Press 1982) are incorporated by reference for showing the mathematical processes related to computer graphics.

U.S. Pat. No. 3,997,891 is hereby incorporated by reference to illustrate one of the input methods and its practice with which this invention would be useful.

CROSS-REFERENCE TO RELATED APPLICATIONS

The subject matter of this patent application is related to the subject matter of copending patent application Ser. No. 926,485 filed 11-3-86.

BACKGROUND OF THE INVENTION

1. Field of the Invention:

This invention relates to computer-aided design systems, i.e., computer controlled graphics and particularly to computer-aided design applications where one of many drawings, views, patterns, lines, or points can be selected for modification by the user. For purposes of explanation, computer-aided drawings comprise a hierarchy, the top being a drawing, a drawing being comprised of one or more views, a view being comprised of one or more patterns, a pattern being comprised of one or more lines, and lines being defined by points. An entity is a member of any level in the hierarchy.

The subject matter includes cursor mark position control having a manual means which determines the position and controls particular energization of a display element to which the control by the input means is directed.

2. Description of Related Art:

In computer controlled graphics, a cursor is an on-screen symbol used to supply feedback to the user by visually indicating the position and set membership of selected displayed entities. A moveable cursor can be used to select entities for purposes of altering the displayed graphics.

Where many entities appear on the screen, e.g., boxes, circles, nuts and bolts, and polygons, selecting the desired entity by moving a selection device to the proximity of the entity to be identified is not an easy process. The mathematical computations require more time because of the increase in the number of points and lines to be taken into account.

The selection devices for computer-aided design (CAD) applications include styli on digitized tablets, mouse, light pens, or joy sticks. Such devices function to return a set of x,y coordinates that indicate where the selection device specifying the cursor has been positioned with respect to the system of coordinates used in the display system. When trying to select a given point or line with a selection device, it is difficult to place the selection device exactly at the x,y coordinates of the entity to be selected. Closely spaced entities increase the difficulties of selecting the desired entity. Correlation, as used herein, is the ability to associate a selected x,y coordinate to a screen entity without ambiguity. Existing techniques are mathematical algorithms for calculating whether each individual vector displayed on a graphic screen is correlated to the x,y position returned by an input device. As the number of vectors displayed on the screen increases, the time required to correlate increases proportionately, since more calculations have to be made on more vectors until the correct vector is identified.

When CAD workstations were connected to large main frame processing units, which were very fast, the time required for the calculations was short. Using such CAD applications on smaller processors, such as personal computers, requires longer periods of time for correlation.

A substantial amount of time is required to correlate graphic data on a CRT screen, and when a large amount of geometry is displayed, the correlation calculations use a large amount of time. Complex geometry in many systems cannot be conveniently edited because of the amount of time required. In graphic programs run on personal computers, correlation usually degrades performance of the system.

The invention to be described has a correlation time, independent from the amount of data and provides almost instantaneous correlation of the selected entity, even when used with slow processors. The invention to be described is device independent and can be adapted for CADAM, e.g., trapping.

Low cost raster devices have graphic hardware that are not capable of differentiating between a single line or multiple lines occupying the same end points. Therefore, in the case of multiple lines having the same x,y coordinates of end points, if one line is to be erased, the system cannot determine whether there are lines beneath it, leaving a space where the line should have been. The effect is that the screen does not display the actual information relating to the drawing. To restore the lines beneath a deleted line, the system has to redraw the display, which is a slow process and requires and operator to constantly work with inaccurate information, constantly selecting the redraw operation. The invention eliminates the above described problems.

U.S. Pat. No. 3,997,891 describes a light pen detection system for detecting the character display are on a cathode ray tube (CRT) display. The character near the pen is marked and, if not the desired one, the detection process continues until an indication is provided indicating that the correct character has been detected. The system according to this patent responds to light on the detecting surface of the pen which means that the selected character is the one having a portion thereof at the point on the display where the pen is positioned.

SUMMARY OF THE INVENTION

In accordance with the invention, a graphics system for displaying entities can select an entity by a moveable cursor, positioned by a device supplying x,y coordinates of the cursor. The method of correlating the cursor to a displayed entity includes storing displayed entities as a bit map of pels at x,y coordinates corresponding to the pels' positions in a display of said bit map. Each displayed entity is assigned a unique assigned tag which is inserted in each cell of a correlation array corresponding to the location in the bit map occupied by the displayed entity. The x,y coordinates of the cursor are converted to a cell number in said correlation array corresponding to the cell having the same x,y coordinates in said bit map and the correlated entity is identified by the value inserted in the cell of the correlation array addressed by the converted coordinates.

BRIEF DESCRIPTION OF THE DRAWINGS

The invention is described in detail by referring to the various figures which illustrate specific embodiments of the invention, and wherein like numerals refer to like elements.

DESCRIPTION OF THE PREFERRED EMBODIMENT

Figure 1:
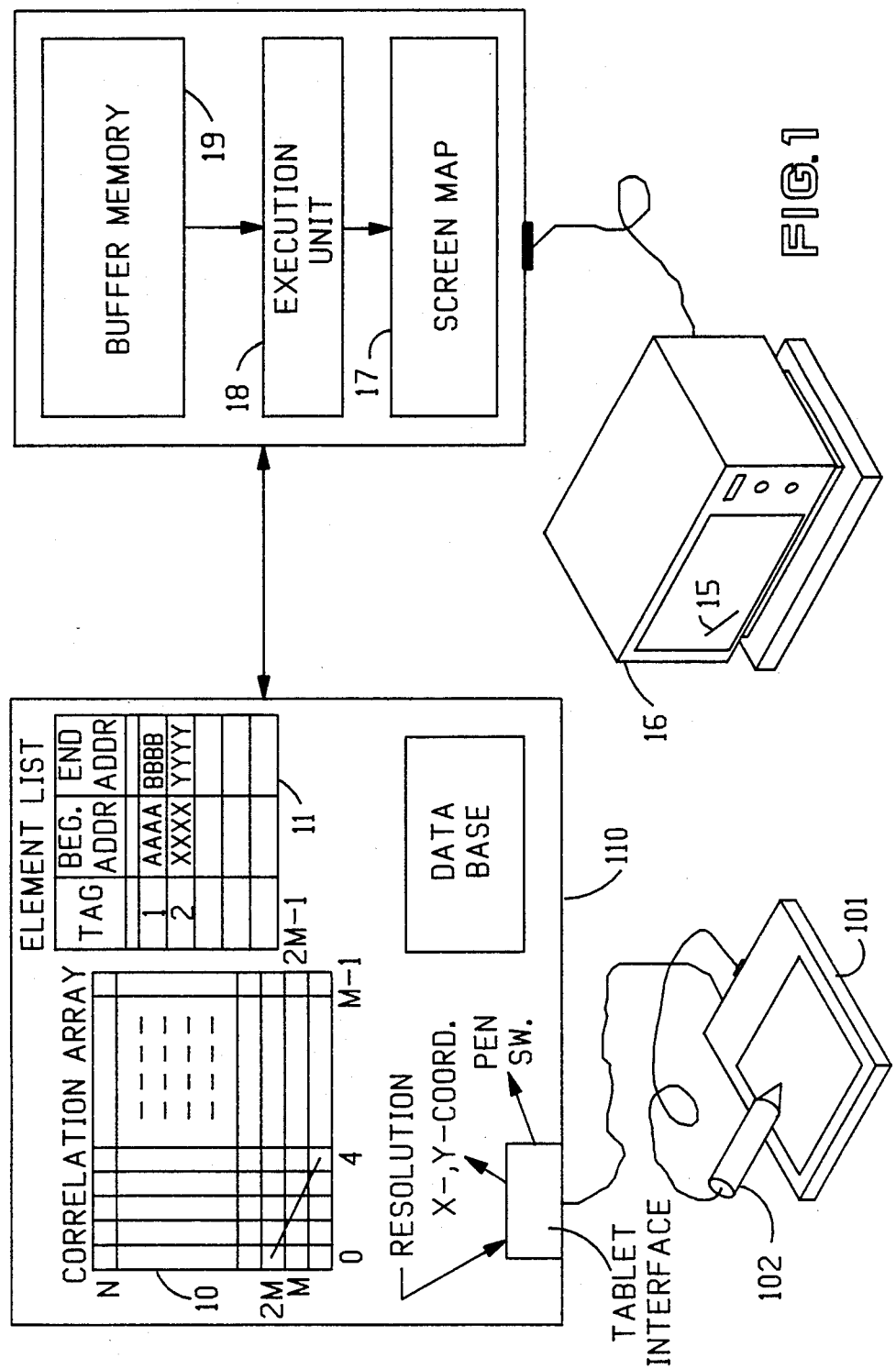
FIG. 1 is a block diagram of a system in which the invention is useful.

FIG. 1 demonstrates a system in which the invention can be utilized and shows the details of interconnections among the various devices and of memory entries.

The input to the system is shown as supplied by a digitizing tablet 101, e.g., commercially available as an IBM Model 5083 II, which supplies signals identifying the x- and y-coordinates of the stylus (or pointer) 102 on the tablet and a select signal which is activated by the operator, e.g., by pushing down on the stylus to activate a switch therein, to signify that a selected point is to be used.

A signal from control unit 110, usually a programmable processor, enables the system to specify a desired sensitivity, i.e., to specify the size of the area around the pointer which should react to the positioning of the pointer.

The display is stored as bits in a screen map 17 which has a bit cell for storing each dot as presented on the screen of a CRT display 16. Normally, if a bit in the screen map 17 is set, i.e., is true, turned on, has a binary value of one, the corresponding point on the screen of the display 16 will be lighted. If a bit in the screen map 17 is reset, i.e., is false, turned off, has a binary value of zero, then the corresponding point on the screen of the display 16 is dark.

When a point is indicated by a moveable cursor, the x,y coordinates of the cursor are to be associated with one of the displayed entities. In this explanation, it will be assumed that the entity selected to be displayed is at the pattern level and that some information as to the selected line or point is also to be determined.

The usual method for associating a cursor point with an entity is to compare the x,y coordinates of the cursor with all the x,y coordinates of the displayed entities. Such a comparison can be expedited by determining whether the cursor's x,y coordinates fall on a line between two points that define a line instead of comparing the coordinates with all the points of the same line. Such calculation is well known in analytic geometry and involves computing the equation of the line associated with its two end points followed by a substitution of x,y values to determine whether the cursor is on the line. Other comparisons are required to ascertain that the cursor is between the two end points since the cursor could be beyond the end points and still fulfill the mathematical requirements for being part of the line.

In the system of the invention, a correlation array 10 or a correlation map is stored in the memory of a control unit 110. Each element in the correlation array 10 can correspond to a selectable, unique position on the digitizing tablet and in the screen map 17. The entities to be displayed by the system are identified by a tag, which for purposes of illustration, are decimal numbers. The tag for each entity is stored in the correlation array 10 at a position corresponding to the bits in the screen map 17 that are used by such entity. The cell corresponding to the cursors x,y coordinates, xt,yt, is found to be cell number = $myt + xt$ where m is the number of cells per row.

This method provides a fast correlation between a cursor's position and the entity at that position.

In such a display system, it is desirable to have high resolution which requires that the screen map 17 have a large capacity. As the number of dots on the display screen, sometimes called pels (picture elements), the ability to place the cursor exactly on an entity becomes more difficult. It also requires that the correlation array 10 be large as well.

To alleviate the last two problems, the correlation array 10 does not have a one-to-one correspondence of cells with pels in the screen map 17. Instead, the correlation array 10 can be arranged to have a cell for each p×q group of pels in the screen map 17. The most useful values of p or q are 2, 4, or 8, but can be other values. The high resolution makes it unlikely that two different entities may occupy the same group of pels. The user, however, has more lee way in the selection of an entity. If the pels are 0.01 mm apart, then a 4×4 cell grouping requires that the cursor be placed not in the 0.01 mm space but in a 0.04 mm space near the entity being selected. The cell in the correlation array 10 corresponding to the p×q group of pels containing the x,y coordinates of the cursor can be determined by cell number = $(yt/p)(m/p) + xt/q$.

An entity to be drawn may first be selected from a menu on the screen of display 16 using the digitized tablet 101 and stylus 102 to position the pointer on the display screen 15. When the desired figure is selected, a description of the procedure to draw the selected figure is displayed on the screen. For example, the instructions for drawing a line may comprise selecting each end point defining the line.

In FIG. 1, a line is shown as drawn between selected correlation cells 4 and 2m. The end points were selected, for example, using the digitizing tablet 101 and stylus 102. The selected end points are the x,y coordinates in the screen map 17. The intermediate points can be calculated from the analytic geometry formula for a straight line expressed as two points, i.e., $(y - y1)/(x - x1) = (y1 - y2)/(x1 - x2)$ where x1,y1 and x2,y2 are the selected end points of the line. (Similar algorithms are available for circles, text, and other forms.) The formula may be used by substituting for x all the intermediate values from x1 to x2 to find the corresponding y intermediate values. These points are converted to memory addresses in the the screen map 17 and the corresponding bits set. At the same time, the corresponding cells in the correlation map can be calculated as explained above and the tag assigned to the entity stored therein. That is, the correlation array cells (or elements) corresponding to the intermediate points are computed and each computed element in the array corresponding to all the points of the line will contain the tag number representing the line stored therein.

Assuming that the tag of the line in the illustration is assigned the value of 1, then the array elements 4, m+3, m+2, 2m+1, and 2m will store the tag value of 1.

Figure 2:
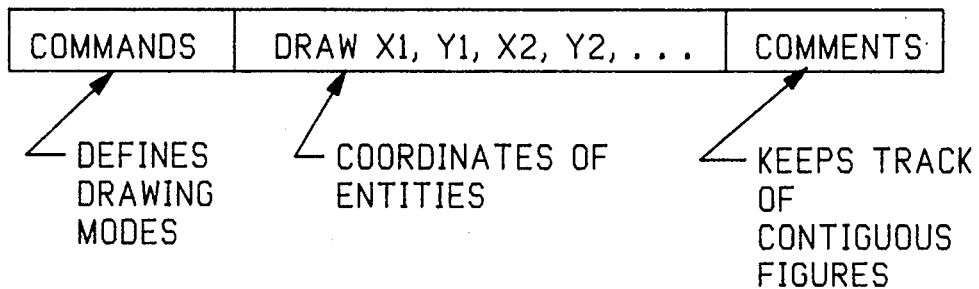
FIG. 2 is an illustration of a buffer command entry or vector.

A buffer memory 19 stores command entries in the form illustrated in FIG. 2. Each such entry or command vector has a field for specifying the color of the figure to be displayed. One field contains a command illustrated in FIG. 2 as DRAW contains the x- and y-coordinates of the end points of the vectors making up the entity corresponding to the command entry. The example in FIG. 2 comprises a typical display list structure. An actual structure may be more complicated, but the important point is that, because x,y coordinates are stored in a display list in a simple, low precision format (typically sixteen bits) and because the list is stored in memory, the computations necessary to perform the correlation to a particular point or line can be accomplished extremely fast. After selection, the tag can be used to extract high precision x,y coordinates from a disk-based data base.

In FIG. 1, execution unit 18 converts the vector information to a raster scan format, storing the desired display information in a screen map 17. The display information is bit-mapped from the screen map 17 to the raster scan display unit 16, shown with a line 15 displayed as the vector stored in the correlation map 10.

The control unit 110 also stores an element list 11. For each entity corresponding to a tag, the beginning and ending addresses of the command vector corresponding entity in the buffer memory 19.

A data base is also maintained in the control unit 110 to permit manipulation of the entities at several levels in a hierarchy as described above.

Color fill-ins and cross-hatching of entities can be stored and moved about as separate entities.

Figure 3:
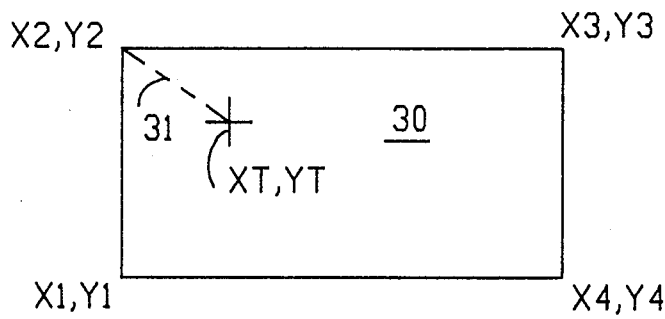
FIG. 3 is an illustration showing the relationship between a cursor and the points defining a polygon.

FIG. 3 shows a rectangle which can be stored as a command vector as follows:

DRAW x1y1x2y2x3y3x4y4x1y1.

The point xt,yt in FIG. 3 represents the position of a cursor defined by the position of a stylus on a digitized tablet, of a light pen on a CRT display, of a mouse on a surface, and the like.

The cursor is first correlated to an entity. In the illustrated example, it is assumed that the cursor is within n (where n continues to represent the group size of pels) pels of the line from x1,y1 to x2,y2 or of the line from x2,y2 to x3,y3. The entity, i.e., the rectangle 30, will be highlighted on the display screen to indicate that it has been selected.

The computations being described are being continually carried on because the cursor may be in motion. Also, the wrong entity is sometimes selected so the user will move the cursor closer to the desired entity until the desired entity has been selected. Highlighting, i.e., brightening the lines of the entity, is one of the methods of indicating which entity has been selected. Other indications may include linking the lines comprising the selected entity or changing their color.

Besides selecting a desired entity, it may also be desirable to select a given line or a given point within that entity. Therefore, in addition to selecting the desired entity and highlighting it, it is also necessary to select the nearest line or point, whichever has been previously designated by the user. In this illustration, a point will be marked by blinking a marker at the point and a line, by blinking a marker at the center point of the line.

To correlate the cursor to the nearest point, an index value related to the distance of the cursor from each point in the entity being stored and displayed—the rectangle 30 in this illustrative example shown in FIG. 3—is calculated and the stored point corresponding to the smallest index value is determined to be the selected point.

In the prior art, the actual distance between the cursor and all other points is calculated using the square root of the quantity $(xt-xi)^2+(yt-yi)^2$.

When the entity has been selected, the element list 11 is accessed and the beginning and ending address of the command vector representing the rectangle 30 in the buffer memory 19 are used to extract the command vector. The four points of representing the entities corners are available from the command vector so retrieved.

The index value for each point xi,yi, where i will range from 1 to 4 in this example, can be calculated by $$I=(xt-xi)^2+(yt-yi)^2 \qquad (1)$$

where the square root is not necessary because the actual distance is not required, merely a value related to the distance and permits ordering the points according to distance. This reduces the time required to calculate each index.

As illustrated in FIG. 3, the point x2,y2 is closest to the cursor and is, therefore, selected. It is usually emphasized on the display as a brighter portion or highlighted cross on the point. Alternatively, the selected point may be identified by a blinking marker such as a small cross centered on the selected point.

Figure 4:
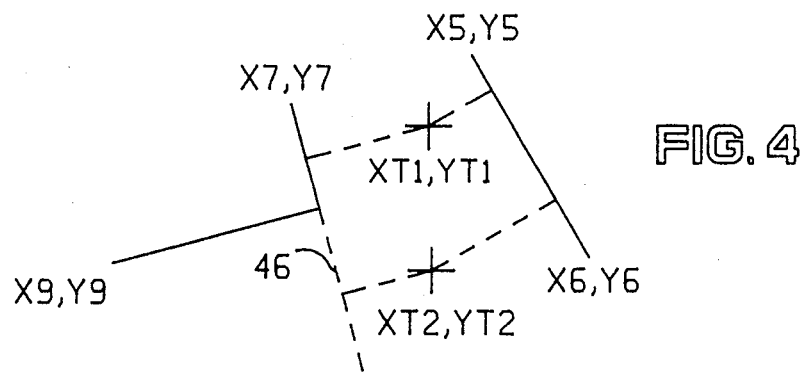
FIG. 4 is an illustration showing the relationship between two cursors and two line.

When the closest line is to be selected by the cursor as shown in FIG. 4, a more complicated calculation is required for determining which line of several lines that may be close together on the display is the line to be selected. A calculation of the index value, I, representing a proportional distance value between a line and the cursor is $$I=([(y6-y5)xt]+[(x6-x5)yt])/([y6-y5]+[x6-x5]) \qquad (2)$$

A faster result can be derived by performing the subtractions only once instead of twice as equation (2); that is, $$A=[yk-yj]$$

$$B=[xk/k-xj]$$

$$I=([Axt]+[Byt])/(A+B) \qquad (3)$$

where xk,yk and xj,yj are the point pairs that identify each line tested in the display.

When testing for proximity to a line, an additional test is required to verify that the cursor is not correlated to a phantom line such as the extension of a line. In FIG. 4, a dotted line 46 shows an extension of a line defined by the end points x7,y7 and x8,y8. A cursor at the location xt2,yt2 would be incorrectly correlated to the extension line because it is closer thereto than it is to the line with the end points x5,y5 and x6,y6. It is, however, desired to have the cursor xt2,yt2 correlated to the latter line.

Therefore, in addition to performing the index calculations, it is also necessary to perform an additional calculation to insure that a normal line from the cursor will intersect the line being considered between its end points. One approach is to calculate the following values:

$$M = (y2 - y1)/(x2 - x1)$$

$$X = (x1 - xt + M(yt - y1))/2$$

$$Y = (y1 + yt + M(xt - x1))/2$$

where M is actually the slope of the line designated by end points x1,y1 and x2,y2. Division by two is easily accomplished in microprocessors by shifting the quantity to be divided one bit position to the right. Error accumulation if y2 is close to y1 or if x2 is close to x1 can be reduced by standard techniques well known in the computer art.

After calculating the values of X and Y, a test is made to insure that X falls between x1 and x2 and that Y falls between y1 and y2. If they do not, then the line is not considered as a candidate and the end point pairs are not stored even though the index value is less than the index value of the previous line.

While the invention has been particularly shown and described with reference to a preferred embodiment thereof, it will be understood by those skilled in the art that various changes and modifications in form and details may be made therein without departing from the spirit and scope of the invention according to the following claims.

What is claimed is:

1. In a graphics system wherein displayed entities are selected by a moveable cursor positioned by a device supplying x,y coordinates of said cursor, the method of correlating said cursor to a displayed entity comprising the steps of:
    storing displayed entities as a bit map of pels at x,y coordinates corresponding to the pels' positions in a display of said bit map;
    identifying each displayed entity with a uniquely assigned tag;
    inserting in each cell of a correlation array the tag of a displayed entity occupying a location in said bit map corresponding to said cell;
    convering said x,y coordinates of the cursor to a cell number in said correlation array corresponding to the same x,y coordinates in said bit map; and
    identifying said correlated entity by the value inserted in the cell of the correlation array addressed by the converted coordinates.

2. The method as claimed in claim 1 wherein said inserting step is performed in a cell corresponding to a group of pels in said bit map.

3. The method claimed in claim 2 including a second step of specifying the size of said group of pels in said bit map corresponding to a cell in said correlation array.

* * * * *